US006362771B1

(12) United States Patent
Schofield et al.

(10) Patent No.: US 6,362,771 B1
(45) Date of Patent: Mar. 26, 2002

(54) GARAGE DOOR OPENER SYSTEM FOR VEHICLES USING MANUFACTURER-SUPPLIED EQUIPMENT

(75) Inventors: Kenneth Schofield, Holland; Mark L. Larson, Grand Haven; David W. Taylor, Fenton, all of MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/300,588

(22) Filed: Apr. 27, 1999

Related U.S. Application Data

(60) Provisional application No. 60/083,609, filed on Apr. 30, 1998.

(51) Int. Cl.[7] .......................... G08C 19/12; H04L 17/02

(52) U.S. Cl. .................... 341/176; 340/825.72; 455/99; 296/37.8

(58) Field of Search ........................... 341/176; 405/99; 296/37.8; 340/825.69, 825.72

(56) References Cited

U.S. PATENT DOCUMENTS

| | | | | | |
|---|---|---|---|---|---|
| 4,241,870 | A | * | 12/1980 | Marcus | 296/37.7 |
| 4,247,850 | A | * | 1/1981 | Marcus | 341/176 |
| 4,595,228 | A | * | 6/1986 | Chu | 296/37.7 |
| 5,184,132 | A | * | 2/1993 | Baird | 341/176 |
| 5,522,638 | A | * | 6/1996 | Falcoff et al. | 296/37.8 |
| 5,627,529 | A | * | 5/1997 | Duckworth et al. | 340/825.69 |
| 5,887,929 | A | * | 3/1999 | Miller et al. | 296/37.8 |
| 6,091,330 | A | * | 7/2000 | Swan et al. | 340/539 |
| 6,126,221 | A | * | 10/2000 | Kern | 296/37.7 |
| 6,135,528 | A | * | 10/2000 | Sobieski et al. | 296/37.7 |

* cited by examiner

*Primary Examiner*—Timothy Edward, Jr.
(74) *Attorney, Agent, or Firm*—Van Dyke, Gardner, Linn & Burkhart, LLP

(57) ABSTRACT

A vehicle-based garage door opener system for use with a hand-held transmitter unit includes a user-operable input device, a cradle configured to support a hand-held transmitting unit located remotely from the input device and a link between the input device and the cradle.

23 Claims, 2 Drawing Sheets

GARAGE DOOR OPENER SYSTEM FOR VEHICLES USING MANUFACTURER-SUPPLIED EQUIPMENT

This application claims benefit of Provisional application No. 60/083,609, filed Apr. 30, 1998.

BACKGROUND OF THE INVENTION

This invention relates to automotive electronic systems and, in particular, to communication systems, such as of the type which produce a signal capable of initiating operation of a garage door opening device or the like.

Hand-held garage door opener transmitters have traditionally posed a difficulty in providing a convenient location for the device within the vehicle. Such devices have been found attached to the sun visor with Velcro fasteners or metal clips, or stowed loosely in storage compartments, and the like.

In U.S. Pat. No. 4,595,228 for a GARAGE DOOR OPENING TRANSMITTING COMPARTMENT, a compartment is provided in an overhead console of a vehicle having a pivotable door. The driver positions the hand-held transmitting unit of the garage door opener in the compartment. In order to open or close the garage, the driver presses the pivotable door which, in turn, physically actuates the hand-held transmitting unit. The difficulty in such system is that the driver still must reach to the location of the hand-held transmitting unit to actuate the unit. This requires a reach by the driver plus limits the places where the transmitting unit can be placed in the vehicle. Furthermore, the transmitting unit is vulnerable to being easily stolen by anyone having even momentary access to the interior of the passenger compartment.

In order to overcome this difficulty, it has been proposed to incorporate the function of the garage door opener within the vehicle. One such system is disclosed in U.S. Pat. No. 5,479,155 for a VEHICLE ACCESSORY TRAINABLE TRANSMITTER. The difficulty that the ’155 patent was intended to overcome was the encoding of signals from the garage door opener. The signals are encoded in order to reduce the likelihood that a stray signal will open a garage door opener or that an intruder will be able to simulate the garage door opening signal. The ’155 patent discloses a vehicle electronic system having a learning capability in which the hand-held garage door opener transmitter supplied by the manufacturer is trained on the vehicle system and actuated wherein the vehicle system learns the code of the garage door opener.

The state of the art of garage door openers has evolved to the use of rotating codes in which the code transmitted by the hand-held unit and recognized by the garage door opener is constantly changing. While this provides a further enhancement to security, it makes operation of a trainable garage door opening feature in a vehicle unworkable without knowledge of the manufacturer’s coding sequence. The sharing of that information by the manufacturer, in turn, makes the coding sequence known to more persons and, therefore, less secure.

There remains a need for a vehicle-based system which incorporates a garage door opening transmitting function within the vehicle which will accommodate virtually all commercially available garage door opener systems, including those utilizing rotating codes.

SUMMARY OF THE INVENTION

A vehicle-based garage door opener system is provided according to the invention which is useful with a conventional hand-held transmitting unit. The system includes a user-operable input device, which is preferably conveniently located with respect to the driver’s seat, and at least one cradle which is configured to support one or more hand-held transmitting units and located remotely from the input device, such as in a glove compartment, a trunk, a parcel shelf, a seat back, or an off vehicle location. A link is provided between the input device and the at least one cradle and is adapted to actuate the at least one hand-held transmitting unit positioned in the at least one cradle.

One advantage of the garage door opener system according to the invention is that it is useable with all types of vehicle garage door opener hand-held transmitters, including those which transmit analog signals, digital signals, encoded digital signals, and signals encoded with rotating codes, fixed frequency, and spread spectrum RF signals. Indeed, a garage door opener system according to the invention is useable with yet to be garage door systems and is thereby both forwardly and rearwardly compatible. Furthermore, a garage door opener system according to the invention can be added as a feature to the vehicle for relatively low cost because it does not incorporate the garage door function per se into the vehicle. This is especially important with garage door opener systems utilizing rotating codes which, otherwise, would require the vehicle manufacturer to incorporate schemes of numerous garage door opener manufacturers. A garage door opener system according to the invention provides convenient garage door operation to the vehicle operator who merely needs to actuate a button which is in the easy reach of the vehicle operator. Furthermore, this operation is carried out without the garage door opener hand-held unit providing clutter within the vehicle interior. Additionally, a garage door opener system according to the invention allows the hand-held transmitting unit to be positioned in a secure location which is typically equipped with a lock.

These and other objects, advantages and features of this invention will become apparent upon review of the following specification in conjunction with the drawings.

DESCRIPTION OF THE PREFERRED EMBODIMENT

Figure 1:
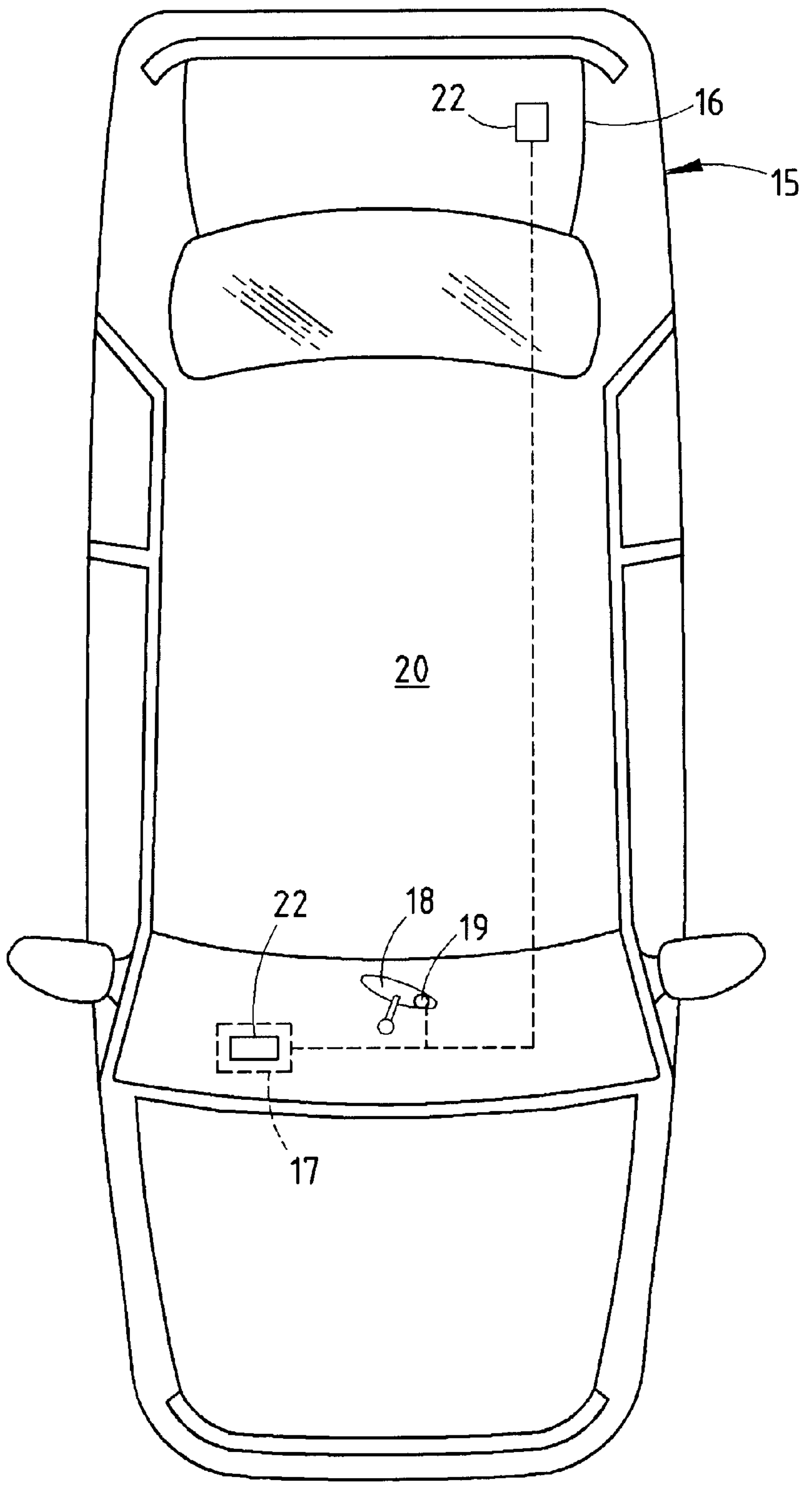
FIG. 1 is a top plan view of a vehicle incorporating a garage door opener system, according to the invention.

Referring now specifically to the drawings, and the illustrative embodiments depicted therein, a vehicle is shown having a vehicle body 15 which is conventionally supplied with a trunk 16 and a glove compartment 17 (FIG. 1). The vehicle additionally includes a user-accessible assembly, such as an interior mirror assembly 18.

A garage door opener system 20 includes a user-operable switch, or button, 19 which may be mounted on interior mirror 18 or other user-accessible assembly, such as the sun visor vehicle dash, steering wheel, or the like. The garage door opener system further includes a cradle 22 which is interconnected with button 19 by a link 21. Cradle 22 is preferably located in a portion of vehicle body 15 which is at least occasionally accessible to the vehicle operator, but which is remote to normal operation of the vehicle. One such portion is glove compartment 17. Another such portion is trunk 16. Other portions include a seat back (not shown) or a parcel shelf (not shown).

Figure 2:
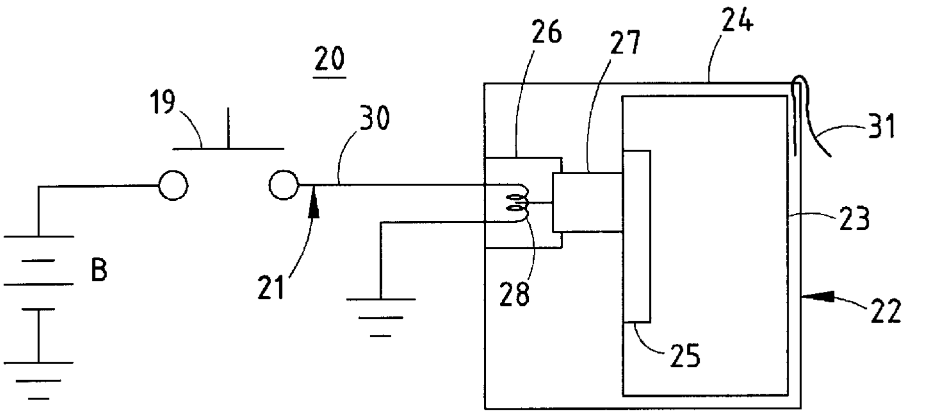
FIG. 2 is a schematic diagram of a garage door opener system, according to the invention.

Cradle 22 includes a housing 24 which is configured to fixedly support a conventional garage door opener hand-held transmitter illustrated at 23 (FIG. 2). Link 21 includes an electro-mechanical actuator 26, which is configured and operational to press or actuate the user actuator 25 of conventional garage door opener 23 and an electrical cable 30 interconnecting actuator 26 with button 19. In the illustrated embodiment, actuator 26 includes a plunger 27 which is deflected in the direction of garage door opener 23 by a solenoid coil 28. Coil 28 is actuated from the vehicle battery B by actuation of button 19.

In operation, the manufacturer positions cradle 22 in a portion of vehicle body 15, such as glove compartment 17, trunk 16, or the like, and mounts button 19 to the vehicle mirror, sun visor, dash, steering wheel, or the like, and interconnects these assemblies in a manner previously described. When the user acquires the vehicle or acquires a new garage door opener system, the conventional garage door opener hand-held transmitter 23 is inserted in cradle 22 and held in place by clips 31 included with the hand-held unit. Cradle 22 may have suitable adjustments to accommodate various sizes of garage door opener transmitters as would be apparent to the skilled artisan. When the vehicle operator actuates button 19, the current from vehicle battery B causes actuator 26 to operate user actuator 25, thereby causing the garage door opener 23 to emit its signal.

Figure 3:
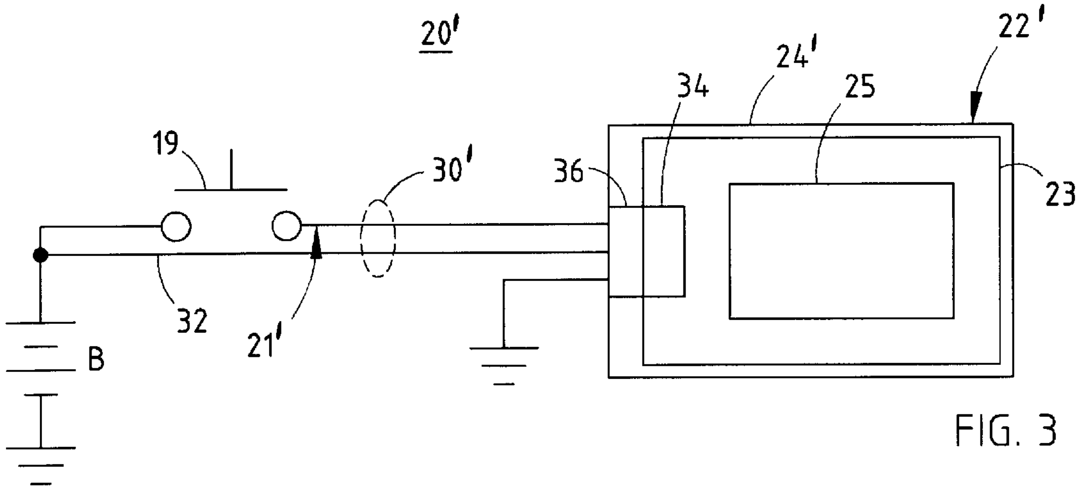
FIG. 3 is the same view as FIG. 2 of an alternative embodiment thereof.

Garage door opener system 20 does not require any modification to the hand-held unit 23 of the garage door opener system. In a garage door opener system 20' illustrated in FIG. 3, the garage door opener hand-held unit 23' is modified by the manufacturer to include a connector 34 which provides actuation of the garage door opener hand-held unit independent of user actuator 25. Garage door opener system 20' includes a link 21' which includes connector 36 which is interconnected with both button 19 and, optionally, with vehicle battery B through a power lead 32. In this manner, when connector 36 is interconnected with connector 34, the battery power to operate the garage door opener hand-held unit 23' and the actuating signal from button 19 are supplied to the hand-held unit through the connectors. This avoids a necessity for an electro-mechanical actuator to directly actuate the user actuator 25. However, garage door opener system 20' incorporates the advantage of the flexibility of producing the encoded signal required for operation of the garage door opener associated with whatever hand-held unit 23' is utilized by the vehicle operator.

Figure 4:
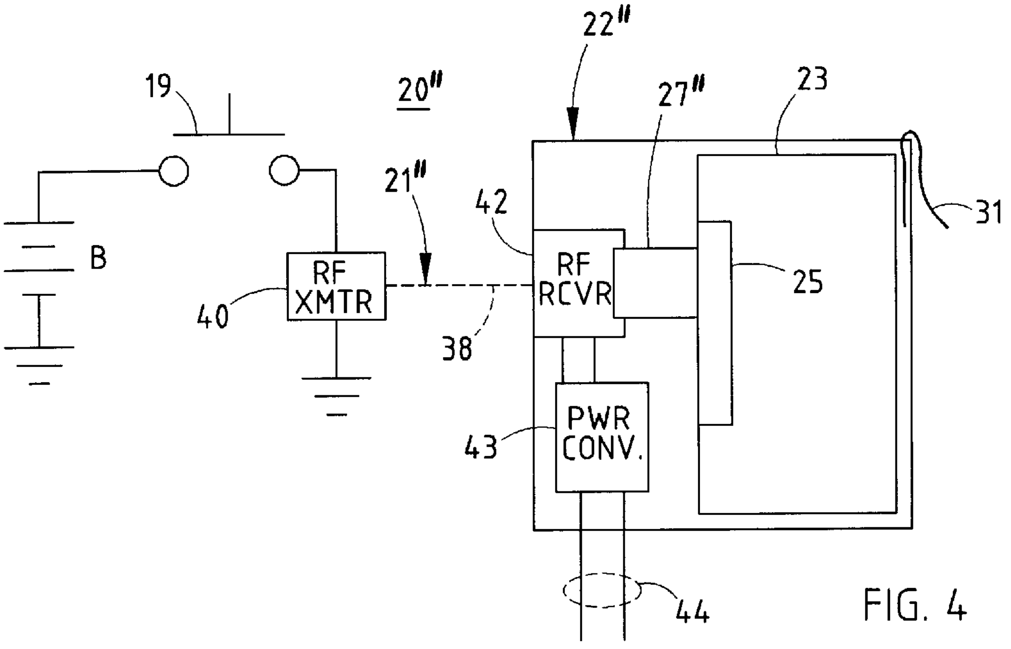
FIG. 4 is the same view as FIG. 2 of yet another alternative embodiment thereof.

In a garage door opener system 20" illustrated in FIG. 4, a wireless link, which is preferably a radio-frequency (RF) link 21", is provided between user operable switch 19 and a cradle 22". RF link 21' includes an RF transmitter 40 which is activated by switch 19 to emit an RF signal 38 which may be received by an actuator 42 in cradle 22". Actuator 42 includes an RF receiver to receive the RF signal emitted by transmitter 40 and plunger 27" which is deflected in response to the RF signal 38 in order to actuate user actuator 25 for a hand-held unit 23 positioned in cradle 22".

In addition to being adapted for placement in the vehicle trunk or glove compartment, cradle 22" can be placed off vehicles such as adjacent to or within the garage equipment with the garage door opener intended to be actuated. Conveniently, cradle 22" may optionally include a paver converter 43 and plug terminals 44. Plug terminals 44 are configured for engagement with a house power outlet, and power converter 43 is configured for converting house power to voltages suitable for actuator 42. In this manner, button 19 and RF transmitter 40 can be factory installed, or after-market installed, in a vehicle with cradle 22" installed in a power outlet adjacent to or within the garage equipped with a garage door opener. The hand-held transmitter for that opener is positioned in cradle 22" and operated by link 22". This configuration provides a two-stage wireless transmission, one including RF transmission 38 and the other from the hand-held transmitter to the opener, which can be easily installed without replacing original equipment.

Link 22" may be encoded or encrypted such as with a digital code which may be fixed or rolling. Because link 22" is wireless, it is possible to incorporate a duplicate button 19 and RF transmitter 40 in a keyless entry transmitter carried with the driver.

While the invention is illustrated for use with a single garage door opener hand-held transmitter unit, it may be used with any number of such units to, for example, be able to selectively open more than one garage door.

As will be apparent to the skilled artisan, the features of garage door opener system 20 and 20' could be combined such that a single system could be installed in vehicle body 15 and useable with a garage door opener hand-held unit 23' which is either supplied with a manufacturer-installed connector 34 or a more conventional hand-held unit 23 not supplied with such connector; in which case, an electro-mechanical actuator 26 would actuate the user actuator 25.

Other user input devices may be utilized to actuate the garage door opener system besides a button or switch. These would include voice-actuated systems and other devices which are capable of receiving an indication from the user. Additionally, the user input can be combined with other input functions as would be apparent to the skilled artisan. Additionally, a link according to the invention may be implemented using a vehicle digital network, carrier current over the vehicle wiring harness, or other such techniques.

Changes and modifications in the specifically described embodiments can be carried out without departing from the principles of the invention which is intended to be limited only by the scope of the appended claims as interpreted according to the principles of patent law including the Doctrine of Equivalents.

The embodiments of the invention in which an exclusive property or privilege is claimed are defined as follows:

1. A vehicle-based garage door opener system for use with a hand-held transmitter unit, comprising:

a user-operable input device;

at least one cradle configured to support at least one hand-held transmitting unit located remotely from said input device; and a link between the input device and the at least one cradle which actuates at least one hand-held transmitting unit positioned in the at least one cradle in response to operation of the input device;

an RF transmitter in wireless communication with an RF receiver, wherein operation of said input device causes transmission of an RF signal between said RF transmitter and said RF receiver in order to actuate said at least one hand-held transmitting unit.

2. The system in claim 1 wherein said link is an electro-mechanical actuator and includes a solenoid operated plunger.

3. The system in claim 1 wherein said at least one cradle is configured for interconnection with an exterior power source.

4. The system in claim 1 wherein said at least one cradle is positioned in the vehicle's glove compartment.

5. The system in claim 1 wherein said at least one cradle is positioned in the vehicle's trunk compartment.

6. The system in claim 1 wherein said at least one cradle is positioned on a parcel shelf.

7. The system in claim 1 wherein said at least cradle is positioned in a vehicle seat back.

8. The system in claim 1 wherein said input device is a switch.

9. The system in claim 8 wherein said switch is mounted on one of the vehicle interior mirror, visor, dashboard and steering wheel.

10. A vehicle-based garage door opener system for use with a hand-held transmitting unit, comprising:

a user-operable input device;

at least one cradle configured to support at least one hand-held transmitting unit located remotely from said input device; and an electro-magnetic actuator between the input device and the at least one cradle which actuates the at least one hand-held transmitting unit positioned in the at least one cradle in response to operation of the input device.

11. The system in claim 10 wherein said at least one cradle is positioned on a parcel shelf.

12. The system in claim 10 wherein said at least cradle is positioned in a vehicle seat back.

13. The system in claim 10 wherein said input device comprises a switch.

14. The system in claim 13 wherein said switch is mounted on one of the vehicle interior mirror, visor, dashboard and steering wheel.

15. The system in claim 10 wherein said at least one cradle is positioned in the vehicle's glove compartment.

16. The system in claim 15 wherein said input device comprises a switch.

17. The system in claim 10 wherein said at least one cradle is positioned in the vehicle's trunk compartment.

18. The system in claim 17 wherein said switch is mounted on one of the vehicle interior mirror, visor, dashboard and steering wheel.

19. A vehicle-based garage door opener system for use with a hand-held transmitter unit, comprising;

a user-operable input device;

a first transmitting unit connector;

at least one cradle configured to support at least one hand-held transmitting unit located remotely from said input device; and a second connector at the at least one cradle, said second connector adapted to interface with said first transmitting unit connector of the at least one hand-held transmitting unit and to enable actuation of said at least one hand-held transmitting unit positioned in the at least one cradle in response to operation of the input device, whereby when said first transmitting unit connector is interconnected with said second connector, battery power to operate the hand-held transmitting unit and an actuating signal from said input device are supplied to the hand-held transmitting unit through said first transmitting unit connector.

20. The system in claim 19 wherein said at least one cradle is positioned in the vehicle's glove compartment.

21. The system in claim 19 wherein said at least one cradle is positioned in the vehicle's trunk compartment.

22. The system in claim 19 wherein said at least one cradle is positioned on a parcel shelf.

23. The system in claim 19 wherein said at least cradle is positioned in a vehicle seat back.

* * * * *